United States Patent
Li et al.

(10) Patent No.: US 12,044,887 B2
(45) Date of Patent: Jul. 23, 2024

(54) FUNNEL LASER COUPLER

(71) Applicant: MACOM Technology Solutions Holdings, Inc., Lowell, MA (US)

(72) Inventors: Yunchu Li, Horseheads, NY (US); Richard R. Grzybowski, Corning, NY (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 115 days.

(21) Appl. No.: 17/952,475

(22) Filed: Sep. 26, 2022

(65) Prior Publication Data

US 2023/0126332 A1    Apr. 27, 2023

Related U.S. Application Data

(60) Provisional application No. 63/270,276, filed on Oct. 21, 2021.

(51) Int. Cl.
| | |
|---|---|
| G02B 6/42 | (2006.01) |
| G02B 6/14 | (2006.01) |
| G02B 6/293 | (2006.01) |

(52) U.S. Cl.
CPC ............. *G02B 6/4215* (2013.01); *G02B 6/14* (2013.01); *G02B 6/2938* (2013.01)

(58) Field of Classification Search
None
See application file for complete search history.

(56) References Cited

U.S. PATENT DOCUMENTS

| | | | | |
|---|---|---|---|---|
| 2004/0105677 | A1* | 6/2004 | Hamada | G02F 1/313 398/79 |
| 2005/0226552 | A1* | 10/2005 | Narevicius | G02F 1/3137 385/28 |
| 2005/0254750 | A1* | 11/2005 | Narevicius | G02B 6/12007 385/28 |
| 2006/0182388 | A1* | 8/2006 | Deliwala | H04B 10/2581 385/28 |
| 2014/0314367 | A1* | 10/2014 | Kojima | G02B 6/2773 385/11 |

(Continued)

OTHER PUBLICATIONS

D. Kharas et al., "High-Power (>300 mW) On-Chip Laser With Passively Aligned Silicon-Nitride Waveguide DBR Cavity," in IEEE Photonics Journal, vol. 12, No. 6, pp. 1-12, Dec. 2020, Art No. 1504612.

(Continued)

*Primary Examiner* — Jerry Rahll
(74) *Attorney, Agent, or Firm* — Faegre Drinker Biddle & Reath LLP

(57) ABSTRACT

An optical coupling system for coupling a light source to a photonic integrated circuit (PIC) comprises a multimode coupler configured to receive an input optical signal of a first mode. The multimode coupler triggers one or more higher-order modes from the input optical signal of the first mode. The optical coupling system also includes a mode de-multiplexer and an optical combiner. The mode de-multiplexer transfers the input optical signal of the first mode and one or more optical signals of the triggered one or more higher-order modes to respective output optical signals of the first mode. The optical combiner combines the respective output optical signals to produce a single output signal of the first mode.

20 Claims, 6 Drawing Sheets

(56) References Cited

U.S. PATENT DOCUMENTS

| | | | | |
|---|---|---|---|---|
| 2015/0030325 A1* | 1/2015 | Chang | ................ | H04B 10/2581 |
| | | | | 398/44 |
| 2016/0131836 A1* | 5/2016 | Matsumoto | ........ | G02B 6/29355 |
| | | | | 385/11 |
| 2019/0011638 A1* | 1/2019 | Soda | .................... | H04B 10/572 |
| 2019/0310424 A1* | 10/2019 | Lamponi | ................ | G02B 6/305 |
| 2021/0088736 A1* | 3/2021 | Li | ........................ | G02B 6/2766 |
| 2022/0368449 A1* | 11/2022 | Jiang | ....................... | H04J 14/04 |

OTHER PUBLICATIONS

Juodkazis, S., "Laser polymerized photonic wire bonds approach 1 Tbit/s data rates," Light Sci, Appl 9, 72, 2020.

* cited by examiner

FUNNEL LASER COUPLER

CROSS-REFERENCE TO RELATED APPLICATION

The present application claims priority to U.S. Provisional Patent Application No. 63/270,276, filed Oct. 21, 2021, the entire disclosure of which is incorporated herein by reference.

FIELD

The present disclosure relates to semiconductor photonic devices and in particular to laser coupler devices.

BACKGROUND

Semiconductor fabrication relates to the mass-manufacturing of semiconductor devices, including optical semiconductor devices and systems. However, a major difficulty in semiconductor technology deals with coupling light to and from optical chips. For instance, coupling an optical device, such as a laser, to a photonic integrated circuit (PIC) relies on incredibly precise mechanical alignment between the laser and waveguides formed in the photonic integrated circuit. Currently, conventional systems utilize single-mode to single-mode coupling, for example, to couple a single-mode optical (e.g., light) signal from the laser into the PIC via a single-mode coupler, such as an inverse tapered waveguide, on the PIC. With such conventional coupling, it is difficult to satisfy various constraints relating to strict alignment tolerances, resulting in low yields for PIC assemblies that meet particular coupling power requirements.

SUMMARY

In an exemplary embodiment of the present disclosure, an optical coupling system for coupling a light source to a photonic integrated circuit (PIC) is provided. The optical coupling system comprises: a multimode coupler configured to receive an input optical signal of a first mode, wherein the multimode coupler triggers one or more higher-order modes from the input optical signal of the first mode; a mode de-multiplexer configured to transfer the input optical signal of the first mode and one or more optical signals of the triggered one or more higher-order modes to respective output optical signals of the first mode; and an optical combiner configured to combine the respective output optical signals to produce a single output signal of the first mode.

In another exemplary embodiment of the present disclosure, an optoelectronic system is provided. The optoelectronic system comprises a photonic integrated circuit (PIC) comprising an input interface and an optical coupling system to couple an optical signal of a first mode from the input interface into the PIC. The optical coupling system comprises: a multimode coupler configured to receive an input optical signal of a first mode, wherein the multimode coupler triggers one or more higher-order modes from the input optical signal of the first mode; a mode de-multiplexer configured to transfer the input optical signal of the first mode and one or more optical signals of the triggered one or more higher-order modes to respective output optical signals of the first mode; and an optical combiner configured to combine the respective output optical signals to produce a single output signal of the first mode.

In yet another exemplary embodiment of the present disclosure, a method of coupling an input optical signal of a first mode into a photonic integrated circuit (PIC) is provided. The method comprises: receiving, by a multimode coupler, an input optical signal of a first mode, wherein the multimode coupler triggers one or more higher-order modes from the input optical signal of the first mode; extracting, by a mode de-multiplexer, one or more mode optical signals of respective one or more modes among the one or more higher-order modes and converting the one or more mode optical signals into respective output optical signals of the first mode; and combining, by an optical combiner, the respective output optical signals to produce a single output signal of the first mode.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
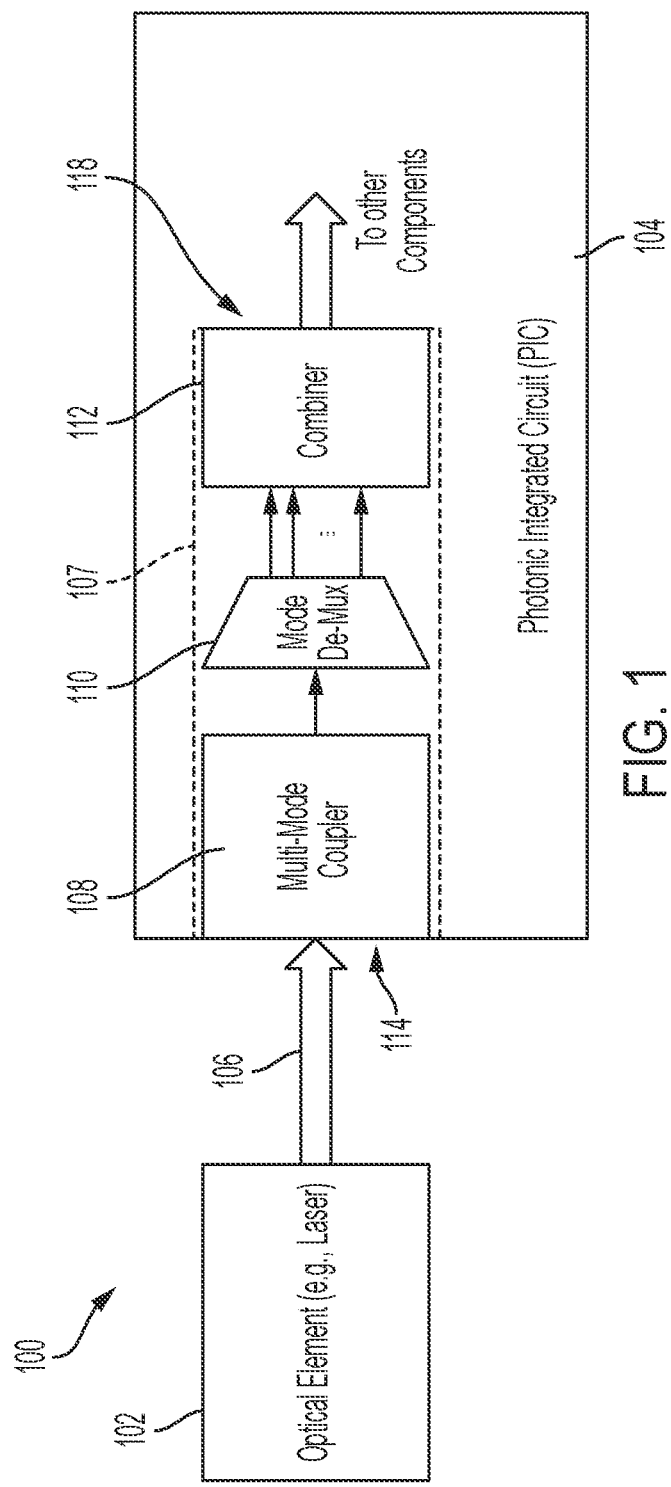
FIG. 1 is a diagram illustrating an exemplary photonic integrated circuit having a multimode optical coupling system, in accordance with various embodiments of the present disclosure.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 is a diagram illustrating an exemplary photonic system 100, according to an embodiment. The photonic system 100 may include an optical element 102 and a photonic integrated circuit 104. The optical element 102 may include an optical device, such as a laser or a fiber, that provides an input optical (e.g., light) signal (e.g., beam) 106 or other optical beam to the photonic integrated circuit 104. In some embodiments, the optical element 102 is a photonic chip, or similar type of chip, separate from the photonic integrated circuit 104 or from a chip in which the photonic integrated circuit 104 is incorporated. In some embodiments, the optical element 102 is a distributed feedback (DFB) laser or another suitable type of laser. In some embodiments, the photonic integrated circuit 104 includes a laser-integrated photonic integrated circuit (LPIC).

The photonic integrated circuit 104 may include an optical coupling system 107 configured to couple the input signal 106 to other component(s) of photonic integrated circuit 104. The optical coupling system 107 may include a multimode coupler 108, a mode de-multiplexer 110 and an optical combiner 112. The multimode coupler 108 may be configured to receive the input signal 106 at an input interface 114 of the optical coupling system 107 and transfer the light to an output interface 118 of the optical coupling system 107. The signal may then be provided from the output interface 118 to one or more other components (not separately shown) on the PIC 104.

With continued reference to FIG. 1, the multimode coupler 108 of the optical coupling system 107 may have a width w and a height h at the input interface 114. The width w of the multimode coupler 108 may be designed to ensure that the optical coupling system 107 has sufficient tolerance to variance in laser coupling offset in the horizontal direction. Laser coupling offset in the horizontal direction may be defined as offset of the horizontal physical position at which the input signal 106 is provided to the photonic integrated circuit 104, in an embodiment. The height h of the multimode coupler 108 may be designed to ensure that the optical coupling system 108 has sufficient tolerance to variance in laser coupling offset in the vertical direction. Laser coupling offset in the vertical direction may be defined as offset of the vertical physical position at which the input signal 106 is provided to the photonic integrated circuit 104, in an embodiment. In an embodiment, the width w of the multimode coupler 108 at the interface 114 is at least substantially equal to 9 μm and the h of the multimode coupler 108 at the input interface 114 is at least substantially equal to 1.3 μm.

In this embodiment, the optical coupling system 108 can tolerate a laser coupling offset of the input signal 106 of at least +/−4 μm in the horizontal direction and +/−0.76 μm in the vertical direction, with acceptable (e.g., 3 dB) coupling loss. In other embodiments, the width w of the multimode coupler 108 at the input interface 114 is a suitable value less than or greater than 9 μm and/or the height h of the multimode coupler 108 at the input interface 114 is a suitable value less than or greater than 1.3 μm. For example, the width w of the multimode coupler 108 at the input interface 114 is a suitable value less than 10 μm, in an embodiment. Generally, the width w of the multimode coupler 108 at the input interface 114 and the height h of the multimode coupler 108 at the input interface 114 may be designed to balance between a desired input signal placement tolerance and desired maximum size of the multimode coupler 108, in various embodiments.

The width w and/or the height h of the multimode coupler 108 at the input interface 114 may be greater than the width w and/or the height h of a single-mode waveguide. The greater width w and/or the height h of the multimode coupler 108 at the input interface 114 allows the multimode coupler 108 to efficiently capture the optical signal 106 with greater alignment tolerance as described above. However, due to the larger width w and/or height h of the multimode coupler 108 at the input interface 114, higher-order modes of light may be triggered in the multimode coupler 108 when a single-mode input optical signal 106 is captured by the multimode coupler 108. As an example, if the input optical signal 106 comprises fundamental transverse electric (TE) mode, e.g., $TE_0$ mode, the triggered optical signals in the multimode coupler 108 may comprise $TE_0$ mode optical signal as well as one or more higher-order mode optical signals, such as, for example, $TE_1$ mode, $TE_2$ mode, and $TE_3$ mode optical signals, in various embodiments. Although the multimode coupler 108 is generally described herein as triggering three higher-order modes ($TE_1$ mode, $TE_2$ mode, $TE_3$ mode), the multimode coupler 108 may trigger less than three higher-order modes (e.g., one higher-order mode or two higher-order modes) or more than three higher-order modes (e.g., four higher-order modes, five higher-order modes, six higher-order modes, etc.), in various embodiments. Generally, larger size of the multimode coupler 108 at the input interface 114 may trigger greater number of higher-order modes in the multimode coupler 108. Also, although example embodiments described herein are generally described with reference to TE modes, the optical coupling system 107 may be designed with TE and/or transverse magnetic (TM) mode polarizations, in various embodiments.

The mode de-multiplexer 110 may extract the light traveling in respective modes in the multimode coupler 108, and may convert the light traveling in the higher-order modes to the fundamental mode, in an embodiment. The extracted and converted optical signals corresponding to the respective modes traveling through the multimode coupler 108 may then be provided in-phase to the optical combiner 112. The optical combiner 112 may combine the respective optical signals and may output a single-mode output optical signal at the output interface 118 of the optical coupling system 108, in an embodiment. Thus, the light may be funneled from the input interface 114 to the output interface 118 with high coupling efficiency and relatively low coupling loss, in various embodiments. As compared to, for example, a conventional single-mode to single-mode coupling system, such as a conventional inverse tapered coupler, in at least some embodiments of the present disclosure the optical coupling system 107 may significantly (e.g., ×2, ×4, ×6, ×10, etc.) increase the tolerance to horizontal and/or vertical offset in the placement of the input signal (e.g., beam) 106 to the PIC 104. In at least some embodiments, the optical coupling system 107 provides the increase in the tolerance to horizontal and/or vertical offset in the placement of the input signal (e.g., beam) 106 to the PIC 104 without any changes to the optical element (e.g., laser) 102 and without significantly increasing the size of the optical coupling system 107 as compared to a conventional single-mode to single-mode coupling system, such as a conventional inverse tapered coupler.

Referring still for FIG. 1, the optical coupling system 107 may be made from silicon nitride ($Si_3Ni_4$) material. For example, active layers in the multimode coupler 108, the mode de-multiplexer 110 and/or the optical combiner 112 may be made of $Si_3Ni_4$ material, in some embodiments. An advantage of $Si_3N_4$ material is that this material can avoid high optical power damage and nonlinear optical loss as compared to silicon material that is typically used in conventional couplers, such as inverse tapered couplers.

Figure 2:
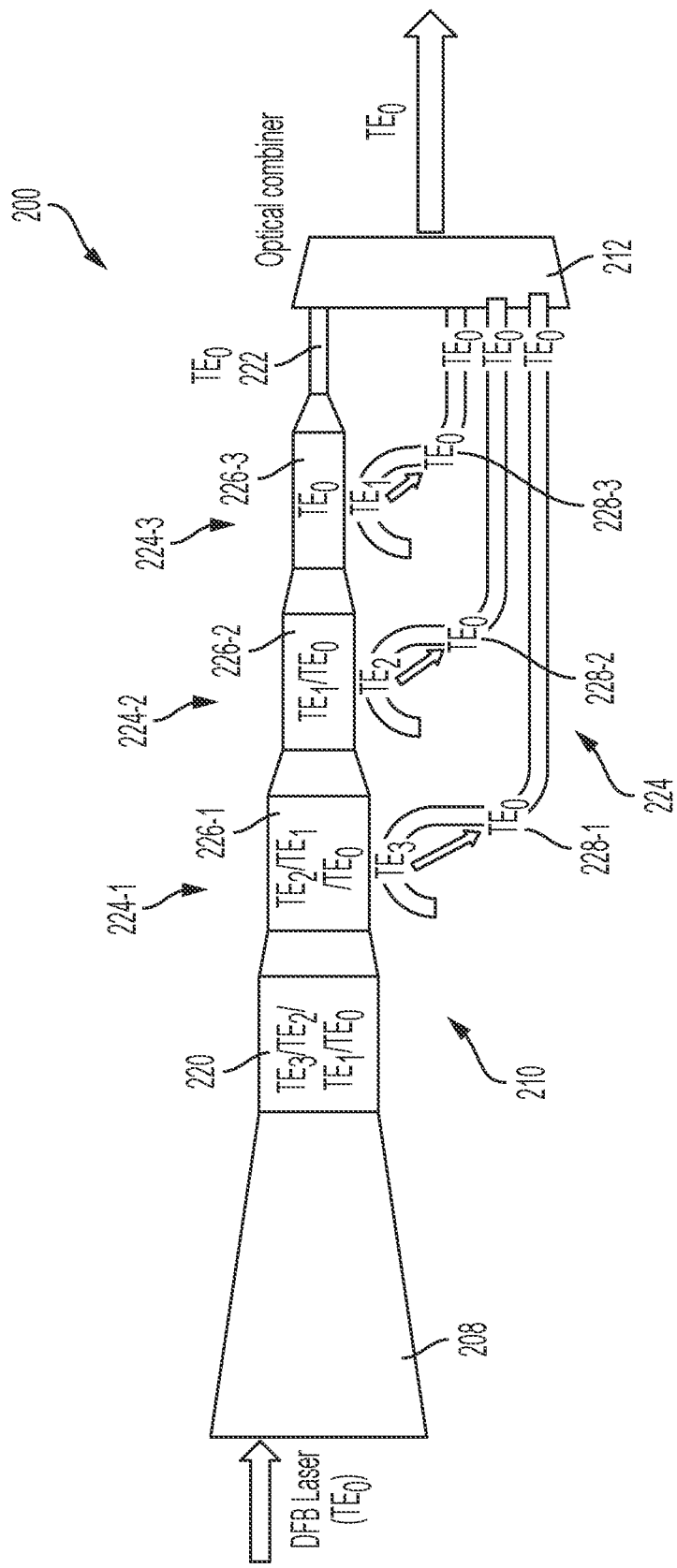
FIG. 2 is a diagram illustrating an exemplary multimode optical coupling system that may be used as the multimode optical coupling system of FIG. 1, in accordance with an embodiment of the present disclosure.

FIG. 2 is a diagram of an example optical coupling system 200 that corresponds to the optical coupling system 107 of FIG. 1, according to an embodiment. The optical coupling system 200 includes a multimode coupler 208 that may correspond to the multimode coupler 108, a mode de-multiplexer 210 that may correspond to the mode de-multiplexer 110 and an optical combiner 212 that may correspond to the optical combiner 112, in an embodiment. The multimode coupler 208 has a tapered design, in the illustrated embodiment. The multimode coupler 208 may utilize a multi-layer structure in order to accommodate the height requirements of the optical coupling system 200 at the input interface 212. For example, maximum thickness of active layer material (e.g. $Si_3Ni_4$) in the multimode coupler 208 may not be enough to accommodate the height requirements of the optical coupling system 200. In this case, multiple active layers may be utilized to receive the input signal. For example, two active layers separated by a certain spacing may be utilized. The spacing between the active layers may be suitably designed to provide the desired height of the multimode coupler 208. One of the active layers (e.g., an upper active layer) may be tapered to couple the optical signal(s) traveling in the active layer to the other active layer (e.g., a lower active layer). The active layer to which the light is coupled (e.g., the lower active layer) may be connected to the mode de-multiplexer 210, which may have a single active layer construction. In other embodiments, other suitable numbers of active layers and/or other suitable active layer arrangements may be utilized for construction of the multimode coupler 208.

Figure 3:
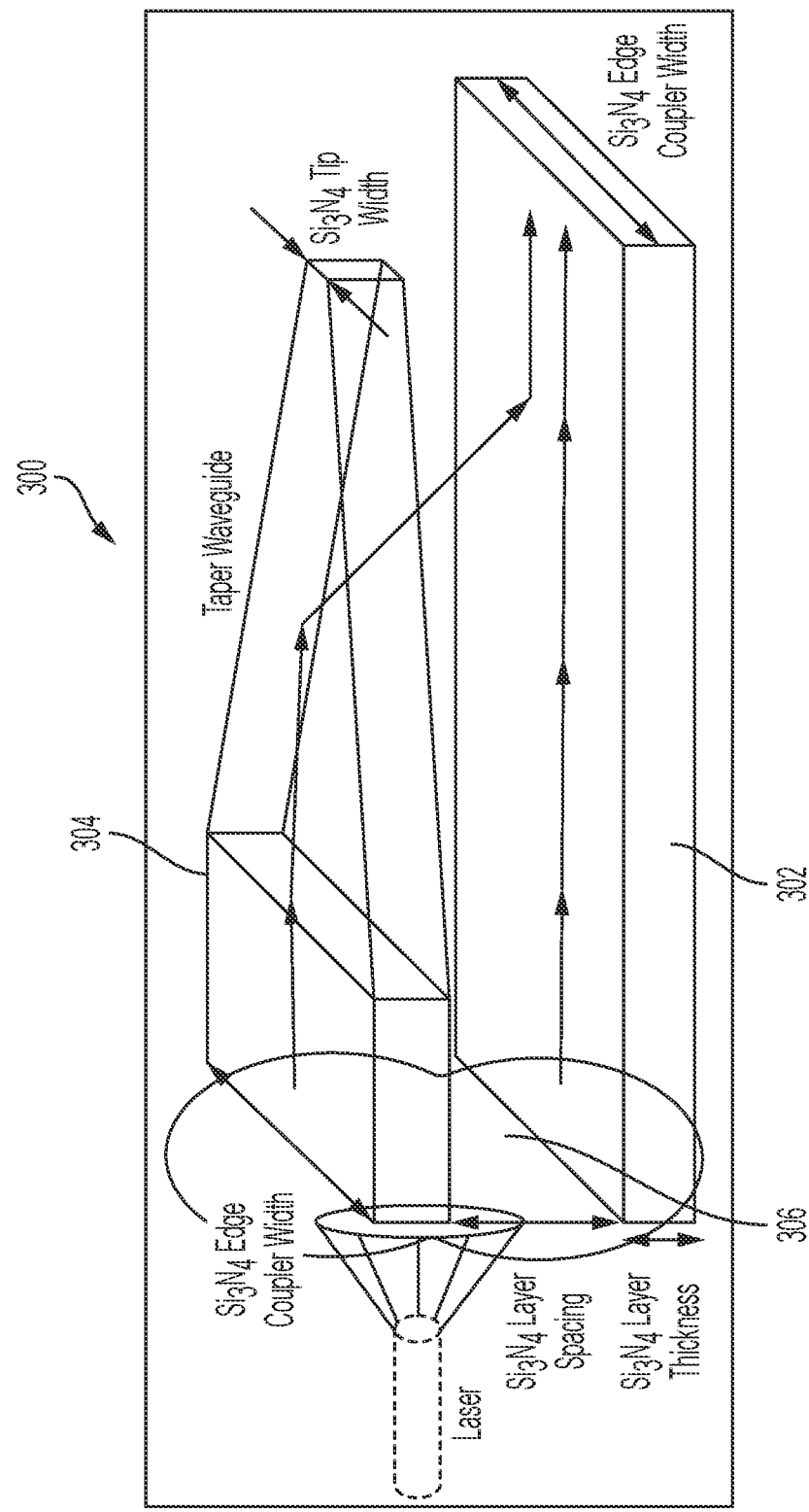
FIG. 3 is a diagram illustrating an exemplary multimode coupler that may be used with the multimode optical coupling system of FIG. 2, in accordance with an embodiment of the present disclosure.

Turning briefly to FIG. 3, an example multimode coupler 300 may be utilized as the multimode coupler 208 of FIG. 2, according to an embodiment. The multimode coupler 300 includes a lower active layer 302 and an upper active layer 304 separated by a spacing 306. Each of the first active layer 302 and a second active layer 304 may have a suitable thickness, such as 0.4 μm or another suitable thickness. The spacing 306 may separate the first active layer 302 and the second active layer 304 and may determine overall height of the multimode coupler 300 and, accordingly, the overall tolerance of input placement of light at the input interface of the multimode coupler 300. In an embodiment, the spacing 306 may be 0.5 μm, resulting in the overall height multimode coupler 300 of 1.3 μm. In another embodiment, another suitable spacing may be utilized. The upper active layer 304 may be tapered such the light traveling through the upper active layer 304 may be coupled onto the lower active layer 302. The width of the tapered tip of the upper active layer 304 may be 0.2 μm, for example. The tapering in the upper active layer 304 may result in variance in the effective index across the upper active layer 304 to couple the light from the upper active layer 304 to the lower active layer 302. As an example, the effective index may vary from being equal to at least approximately 2 at the input interface of the multiple coupler 300 to at least approximately 1.42 at the tip of the active layer 304 of the multiple coupler 300, in an embodiment.

Referring again to FIG. 2, one or more higher-order modes of light may be triggered in the multimode coupler 208 as described above. In an example, three higher-order modes (e.g., $TE_1/TE_2/TE_3$ modes) of light may be triggered in the multimode coupler 208. The mode de-multiplexer 210 may successively extract optical signals of higher-order modes, and convert the signals to the fundamental mode (e.g., $TE_0$ mode), in an embodiment. The mode de-multiplexer 210 may include a plurality of waveguide portions including an input waveguide portion 220, and output waveguide portion 222 and a plurality of middle waveguide portions 224. Respective ones of the middle portions 224 may be configured to convert respective ones of the higher-order modes (e.g., $TE_1/TE_2/TE_3$ modes) of light to the fundamental mode (e.g., $TE_0$ mode). The middle waveguide portions 224 include a first waveguide portion 224-1 configured to convert the $TE_3$ mode of light to the $TE_0$ mode, a second waveguide portion 224-2 configured to convert the $TE_2$ mode of light to the $TE_0$ mode, and a third waveguide portion 224-3 configured to convert the $TE_1$ mode of light to $TE_0$ mode, in the illustrated embodiment. The middle waveguide portions 224 may include fewer than three waveguide portions or greater than three waveguide portions depending on the number of modes triggered in the multimode coupler 208, in other embodiments.

In an embodiment, each waveguide portion 224 may be configured as an asymmetric directional coupler (ADC), having a main path waveguide 226 and a drop path waveguide 228, to couple light of a particular mode of light from the main path waveguide 226 to the drop path waveguide 228. For example, i) the first waveguide portion 224-1 may include a main path waveguide 226-1 and a drop path waveguide 228-1, and may be configured to couple the $TE_3$ mode of light from the main path waveguide 226-1 to the drop path waveguide 228-1, ii) the second waveguide portion 224-2 may include a main path waveguide 226-2 and a drop path waveguide 228-2, and may be configured to couple the $TE_2$ mode of light from the main path waveguide 226-2 to the drop path waveguide 228-2, and iii) the third waveguide portion 224-3 may include a main path waveguide 226-3 and a drop path waveguide 228-3, and may be configured to couple the $TE_1$ mode of light from the main path waveguide 226-3 to the drop path waveguide 228-3. The widths of respective main path waveguides 226 and respective drop path waveguides 228 may be designed such that a particular mode of light is coupled from the main path waveguide 226 to the drop path waveguide 228 and converted to the fundamental mode in the drop path waveguide 228. More specifically, in an embodiment, the widths of respective main path waveguides 226 and respective drop path waveguides 228 are designed such that the effective index in a particular main path waveguide 226 for a mode desired to be coupled to, and converted to the fundamental mode in, the corresponding drop path waveguide 228 is at least substantially equal to the effective index of the fundamental mode in the corresponding drop path waveguide 228.

In an example embodiment, widths of the respective drop path waveguides 228 are fixed (e.g., the width of each respective drop path waveguides 228 is 0.9 μm), and the widths of the respective main path waveguides 226 are varied such that the effective indices for respective modes of light in the respective main path waveguides 226 are at least substantially equal to an effective index for the fundamental mode of light in the fixed width drop path waveguides 228. In another embodiment, the widths of respective main path waveguides 226 and respective drop path waveguides 228 may be designed in other suitable manners that ensure that a particular mode of light is coupled from the main path waveguide 226 to the drop path waveguide 228 and converted to the fundamental mode in the drop path waveguide 228.

Figure 4:
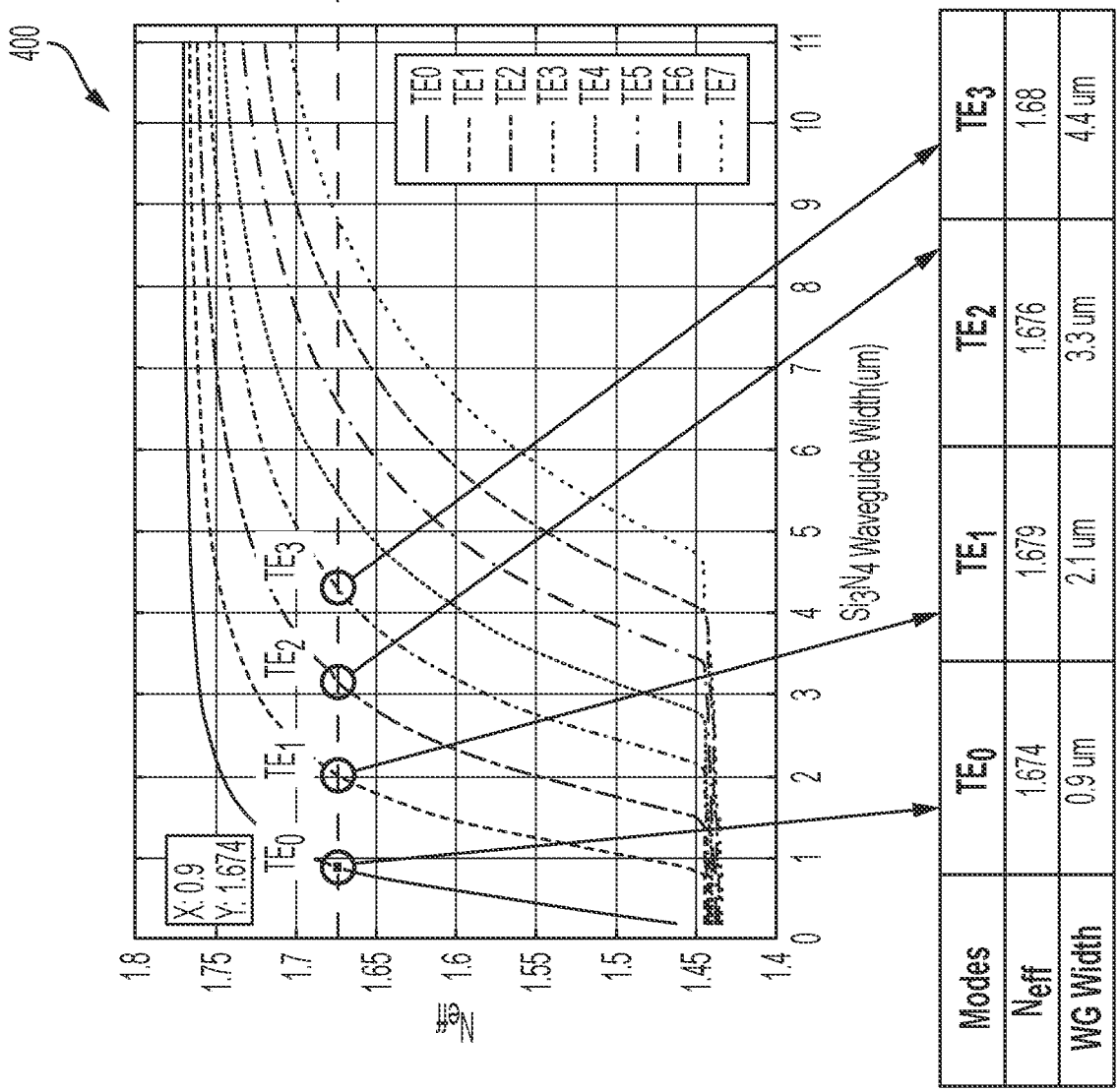
FIG. 4 is a plot of effective index versus waveguide width for silicon nitride ($Si_3Ni_4$) waveguides that may be utilized with the multimode optical coupling system of FIG. 2, in accordance with an embodiment of the present disclosure.

Referring briefly to FIG. 4, a plot 400 of effective index versus waveguide width for $Si_3Ni_4$ waveguides is illustrated. According to the plot 400, the effective index for the $TE_0$ mode in an $Si_3Ni_4$ waveguide having the width of 0.9 μm is 1.6774. Accordingly, in an embodiment in which each drop path waveguide 228 has a width of 0.9 μm, the width of each particular main path waveguides 226 may be designed such that the effective index of the mode desired to be converted from the main path waveguide 226 is at least substantially equal to 1.6774. Thus, for example, based on the plot 400, the width of the main path waveguide 226-1 of the waveguide portion 224-1 may be designed to be at least substantially equal to 4.4 μm such that the effective of the main path waveguide 226-1 in the waveguide portion 224-1 for the $TE_3$ mode is at least substantially equal to 1.6774. Because the effective of the main path waveguide 226-1 in the waveguide portion 224-1 for the $TE_3$ mode is at least substantially equal to the effective index in the drop path waveguide 226 for the $TE_0$ mode, light of the $TE_3$ mode is coupled from the main path waveguide 226-1 to the drop path waveguide 228-1 and is converted to the $TE_0$ mode. Similarly, i) the width of the main path waveguide 226-2 of the waveguide portion 224-2 may be least substantially equal to 3.3 μm such that the effective of the main path waveguide 226-2 for the $TE_2$ mode is at least substantially equal to 1.6774 and ii) the width of the main path waveguide 226-3 of the waveguide portion 224-3 may be least substantially equal to 2.1 μm such that the effective of the main path waveguide 226-3 for the $TE_1$ mode is at least substantially equal to 1.6774, in an embodiment. Accordingly, i) light of the $TE_2$ mode is coupled from the main path waveguide 226-2 to the drop path waveguide 228-2 and is converted to the $TE_0$ mode and i) light of the $TE_1$ mode is coupled from the main path waveguide 226-3 to the drop path waveguide 228-3 and is converted to the $TE_0$ mode, in an embodiment.

Referring again to FIG. 2, the optical signals converted from the higher-order modes to the fundamental mode in the waveguide portions 224, along with the fundamental mode optical signal traveling through the optical coupling system 200, may be provided in-phase to the optical combiner 212. The optical combiner 212 may combine the in-phase fundamental mode optical signals to generate a single fundamental mode optical signal at the output of the optical coupling system 200. In an embodiment, ports of the optical combiner 212 at the input interface to the optical combiner 212 may be of a different (e.g., narrower or wider) width from the widths of the drop path waveguides 228. As an example widths of the drop path waveguides 228 may be 0.9 μm as described above, whereas the ports of the optical combiner 212 may be 0.8 μm wide at the input interface to the optical combiner 212. The drop path waveguides 228 may include a transition (e.g., a taper) to transition from the width of the waveguides 228 to the width of the port of the optical combiner 212. In an embodiment, the position (e.g., distance from the input interface to the optical combiner 212) at which each drop path waveguide 228 is transitioned from the width of the drop path waveguide 228 to the width of the port of the optical combiner 212 may be designed to adjust the phase of the corresponding optical signal at the input interface to the optical combiner 212 to ensure that the optical signals are provided in phase to the optical combiner 212. Using the position (e.g., distance from the input interface to the optical combiner 212) at which each drop path waveguide 228 is transitioned (e.g., tapered) to the width of the ports of the optical combiner 212 to adjust the phases of the signals provided to the optical combiner 212 allows the optical coupling system 200 to perform passive phase adjustment and eliminates the need for active (e.g., thermal) phase tuning, in at least some embodiments. Passive phase adjustment may result in less power used by the optical coupling system 200, less heat produced by the system 200, a smaller size of the optical coupling system 200, etc., in various embodiments.

Figure 5B:
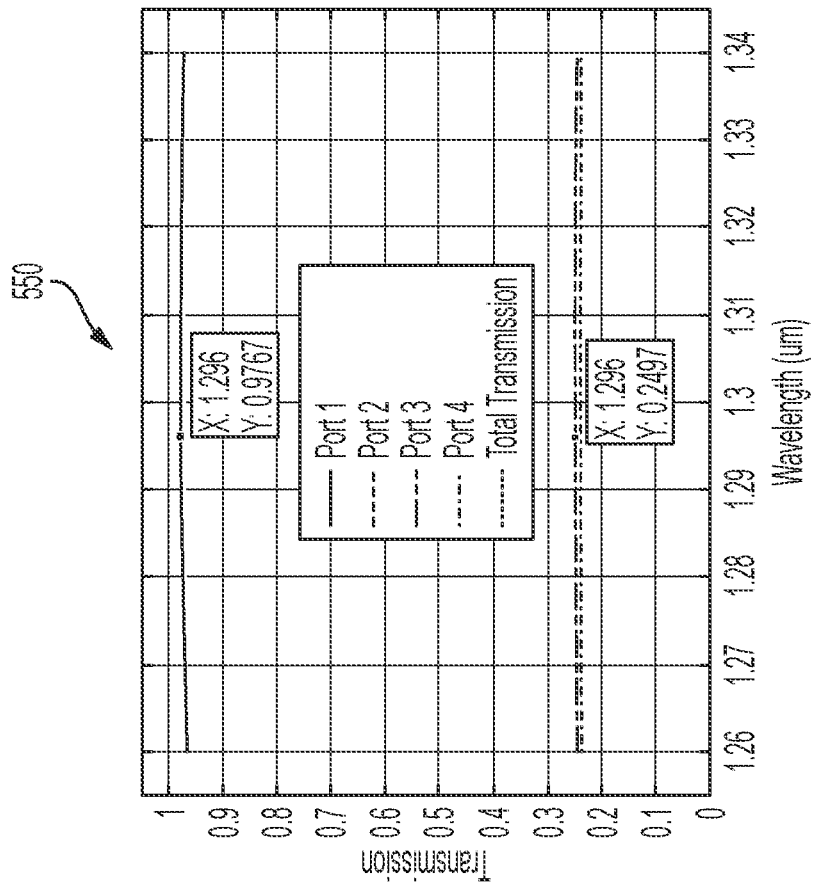
FIG. 5B is a plot of transmission versus wavelength in the optical combiner of FIG. 5A, in accordance with an embodiment of the present disclosure.
Figure 5A:
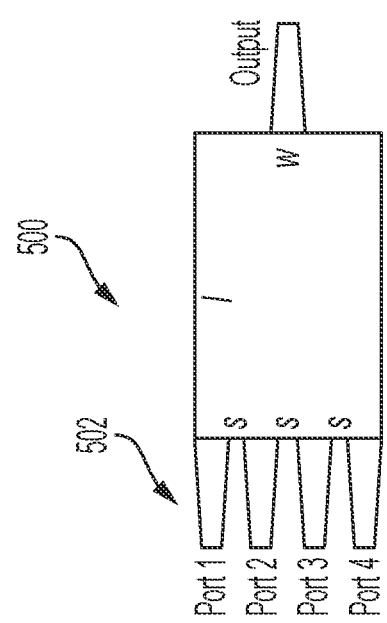
FIG. 5A is a diagram illustrating an exemplary optical combiner that may be used with the multimode optical coupling system of FIG. 2, in accordance with an embodiment of the present disclosure.

Referring now to FIG. 5A, an example optical combiner 500 may correspond to the optical combiner 212, in an embodiment. The optical combiner 500 may be a 1×4 multimode interference (MMI) combiner, for example. The optical combiner 500 may have a width w to accommodate four input ports 502 with a spacing s between respective ones of the input ports 502. In an embodiment, the width w of the optical combiner 500 is 7.06 μm and the spacing s between the respective ones of the ports 502 is 0.5 μm. The length l of the optical combiner 500 may be designed such that at least substantially equal amounts of power are transferred from each of the ports 502. In an embodiment, the length l of the optical combiner 500 is 16.1 μm. The length of each port 502 is 3.26 μm is an embodiment. With these parameter vales, as shown in a transmission vs wavelength plot 550 of FIG. 5B, insertion loss of less than 0.1 dB across the O band in the optical combiner 500 may be achieved. In other embodiments, other suitable parameter values may be utilized.

Figure 6A:
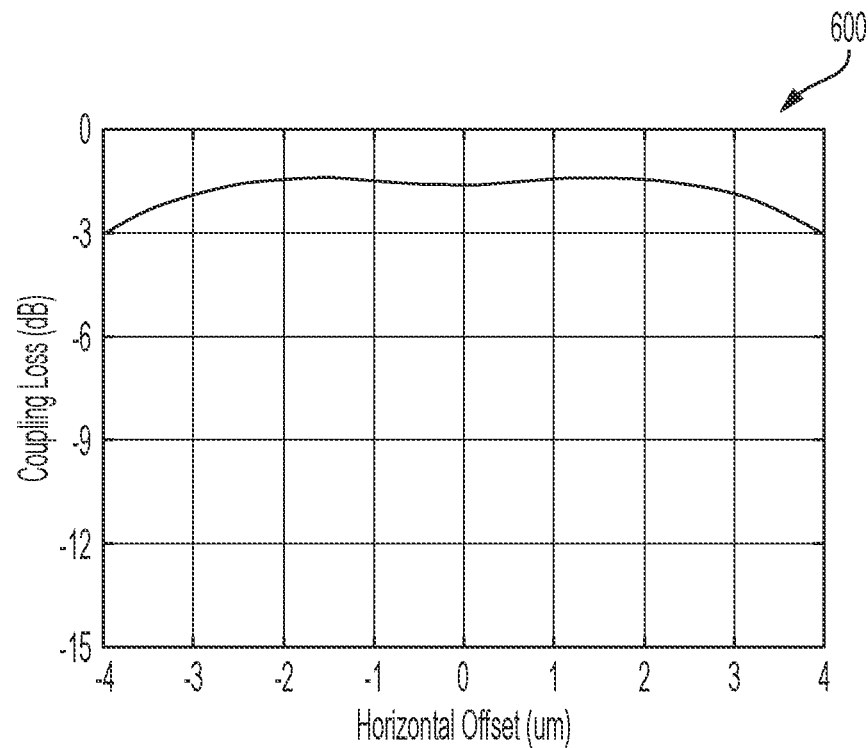
FIG. 6A is a plot illustrating coupling loss as a function of horizontal offset of light source input to the multimode optical coupling system of FIG. 2, in accordance with an embodiment of the present disclosure.
Figure 6B:
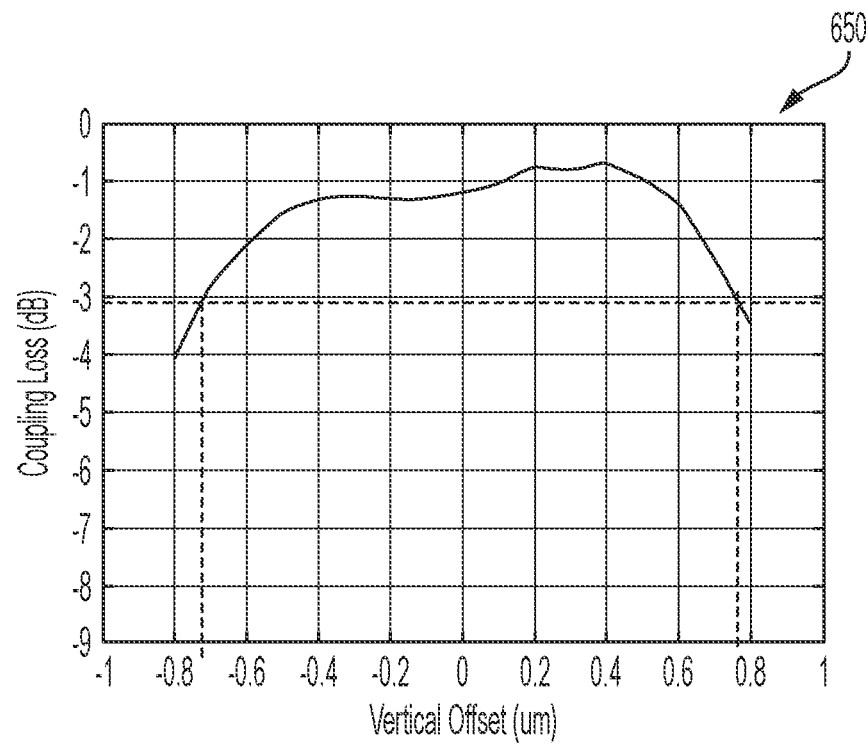
FIG. 6B is a plot illustrating coupling loss as a function of vertical offset of light source input to the multimode optical coupling system of FIG. 2, in accordance with an embodiment of the present disclosure.

FIGS. 6A-B are plots 600, 650 illustrating coupling loss as a function of, respectively, horizontal and vertical offset of light source input to the optical coupling system 200 of FIG. 2, in accordance with an embodiment of the present disclosure. As shown in the plots 600, 650, the laser coupling offset tolerance of the optical coupling system 200 is approximately +/−3.8 μm in the horizontal direction and +/−0.76 μm in the vertical direction. With such tolerances to the horizontal and vertical laser alignment, the optical coupling system 200 may achieve 100% yield with coupling efficiency higher than 50% (3 dB), in at least some embodiments.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An optical coupling system for coupling a light source to a photonic integrated circuit (PIC), the optical coupling system comprising
   a multimode coupler configured to receive an input optical signal of a first mode, wherein the multimode coupler triggers one or more higher-order modes from the input optical signal of the first mode;
a mode de-multiplexer configured to transfer the input optical signal of the first mode and one or more optical signals of the triggered one or more higher-order modes to respective output optical signals of the first mode; and
an optical combiner configured to combine the respective output optical signals to produce a single output signal of the first mode.

2. The optical coupling system of claim 1, wherein the multimode coupler comprises multiple active layers, respective ones of the multiple active layers separated by a spacing.

3. The optical coupling system of claim 2, wherein the multiple active layers include an upper active layer and a lower active layer.

4. The optical coupling system of claim 3, wherein one of the upper active layer and the lower active layer is tapered to couple light from the one of the upper active layer and the lower active layer to the other one of the upper active layer and the lower active layer.

5. The optical coupling system of claim 1, wherein the mode de-multiplexer comprises a plurality of waveguide portions, wherein respective ones of the plurality of waveguide portions are configured to convert respective ones of the higher-order mode signals to the respective output signals of the first mode.

6. The optical coupling system of claim 1, wherein the first mode is a first transverse electric (TE) mode, the first TE mode being a $TE_0$ mode, and the one or more higher-order modes include at least a $TE_1$ mode, a $TE_2$ mode and a $TE_3$ mode.

7. The optical coupling system of claim 1, wherein each of one or more of the multimode coupler, the mode de-multiplexer and the optical combiner is made from silicon nitride ($Si_3N_4$) material.

8. The optical coupling system of claim 1, wherein:
the optical combiner comprises a plurality of input ports, each input port having a first width at an input interface to the optical combiner,
the mode de-multiplexer comprises a plurality of output waveguides, each output waveguide having a second width different from the first width, and
the optical coupling system further comprises a plurality of transitions to transition each output waveguide from the second width to the first width for providing optical signals traveling in the plurality of output waveguides of the mode de-multiplexer to the plurality of input ports of the optical combiner.

9. The optical coupling system of claim 8, wherein respective positions of transitions, among the plurality of transitions, are different to provide respective adjustments of phase of respective optical signals traveling in respective ones of the plurality of output waveguides such that the respective optical signals arrive in-phase at the input interface to the optical combiner.

10. An optoelectronic system, comprising:
a photonic integrated circuit (PIC) comprising an input interface and an optical coupling system to couple an optical signal of a first mode from the input interface into the PIC, wherein the optical coupling system comprises:
a multimode coupler configured to receive an input optical signal of a first mode, wherein the multimode coupler triggers one or more higher-order modes from the input optical signal of the first mode;
a mode de-multiplexer configured to transfer the input optical signal of the first mode and one or more optical signals of the triggered one or more higher-order modes to respective output optical signals of the first mode; and
an optical combiner configured to combine the respective output optical signals to produce a single output signal of the first mode.

11. The optoelectronic system claim 10, wherein
the multimode coupler comprises multiple active layers, respective ones of the multiple active layers separated by a spacing, and
the multiple active layers include an upper active layer and a lower layer.

12. The optoelectronic system claim 11, wherein one of the upper active layer and the lower active layer is tapered to couple light from the one of the upper active layer and the lower active layer to the other one of the upper active layer and the lower active layer.

13. The optoelectronic system claim 10, wherein the mode de-multiplexer comprises a plurality of waveguide portions, wherein respective ones of the plurality of waveguide portions are configured to convert respective ones of the higher-order mode signals to the respective output signals of the first mode.

14. The optoelectronic system claim 10, wherein the first mode is a first transverse electric (TE) mode, the first TE mode being a $TE_0$ mode, and the one or more higher-order modes include at least a $TE_1$ mode, a $TE_2$ mode and a $TE_3$ mode.

15. The optoelectronic system claim 10, wherein each of one or more of the multimode coupler, the mode de-multiplexer and the optical combiner is made from silicon nitride ($Si_3N_4$) material.

16. The optoelectronic system claim 10, wherein:
the optical combiner comprises a plurality of input ports, each input port having a first width at an input interface to the optical combiner,
the mode de-multiplexer comprises a plurality of output waveguides, each output waveguide having a second width different from the first width, and
the optical coupling system further comprises a plurality of transitions to transition each output waveguide from the second width to the first width for providing optical signals traveling in the plurality of output waveguides of the mode de-multiplexer to the plurality of input ports of the optical combiner.

17. The optoelectronic system claim 16, respective positions of transitions, among the plurality of transitions, are different to provide respective adjustments of phase of respective optical signals traveling in respective ones of the plurality of output waveguides such that the respective optical signals arrive in-phase at the input interface to the optical combiner.

18. A method of coupling an input optical signal of a first mode into a photonic integrated circuit (PIC), the method comprising:
receiving, by a multimode coupler, an input optical signal of a first mode, wherein the multimode coupler triggers one or more higher-order modes from the input optical signal of the first mode;
extracting, by a mode de-multiplexer, one or more optical signals of respective one or more modes among the one or more higher-order modes and converting the one or more mode optical signals into respective output optical signals of the first mode; and combining, by an optical combiner, the respective output optical signals to produce a single output signal of the first mode.

19. The method claim 18, wherein the first mode is a first transverse electric (TE) mode, the first TE mode being a $TE_0$ mode, and the one or more higher-order modes include at least a $TE_1$ mode, a $TE_2$ mode and a $TE_3$ mode.

20. The method claim 18, wherein each of the multimode coupler, the mode de-multiplexer and the combiner is made from silicon nitride ($Si_3N_4$) material.

* * * * *